US006568187B1

(12) United States Patent
Jorgensen et al.

(10) Patent No.: US 6,568,187 B1
(45) Date of Patent: May 27, 2003

(54) EFFUSION COOLED TRANSITION DUCT

(75) Inventors: Stephen W. Jorgensen, Stuart, FL (US); James H. Leahy, Jr., Tequesta, FL (US)

(73) Assignee: Power Systems Mfg, LLC, Jupiter, FL (US)

( * ) Notice: Subject to any disclaimer, the term of this patent is extended or adjusted under 35 U.S.C. 154(b) by 0 days.

(21) Appl. No.: 09/683,290

(22) Filed: Dec. 10, 2001

(51) Int. Cl.[7] ................................ F02C 3/14; F02C 7/18
(52) U.S. Cl. .............................. 60/752; 60/754; 60/757
(58) Field of Search .......................... 60/752, 753, 754, 60/755, 756, 757, 758, 759, 760, 39.37, 798, 800

(56) References Cited

U.S. PATENT DOCUMENTS

| | | | | | |
|---|---|---|---|---|---|
| 2,664,702 | A | * | 1/1954 | Lloyd et al. | 60/752 |
| 2,958,194 | A | * | 11/1960 | Bayley | 60/760 |
| 3,359,723 | A | * | 12/1967 | Bohensky et al. | 60/775 |
| 3,433,015 | A | * | 3/1969 | Sneeden | 60/804 |
| 3,557,553 | A | * | 1/1971 | Schmitz | 60/754 |
| 4,244,178 | A | * | 1/1981 | Herman et al. | 60/754 |
| 4,339,925 | A | * | 7/1982 | Eggmann et al. | 60/757 |
| 4,719,748 | A | | 1/1988 | Davis, Jr. et al. | |
| 5,181,379 | A | | 1/1993 | Wakeman et al. | |
| 5,233,828 | A | | 8/1993 | Napoli | |
| 5,241,827 | A | | 9/1993 | Lampes | |
| 5,261,223 | A | | 11/1993 | Foltz | |
| 5,279,127 | A | | 1/1994 | Napoli | |
| 5,289,686 | A | | 3/1994 | Razdan et al. | |
| 5,323,602 | A | | 6/1994 | Defever | |
| 5,758,504 | A | | 6/1998 | Abreu et al. | |
| 5,983,641 | A | * | 11/1999 | Mandai et al. | 60/722 |
| 6,006,523 | A | * | 12/1999 | Mandai et al. | 60/722 |
| 6,018,950 | A | * | 2/2000 | Moeller | 60/752 |

* cited by examiner

*Primary Examiner*—Ted Kim
(74) *Attorney, Agent, or Firm*—Brian R. Mack

(57) ABSTRACT

An effusion cooled transition duct for transferring hot gases from a combustor to a turbine is disclosed. The transition duct includes a panel assembly with a generally cylindrical inlet end and a generally rectangular exit end with an increased first and second radius of curvature, a generally cylindrical inlet sleeve, and a generally rectangular end frame. Cooling of the transition duct is accomplished by a plurality of holes angled towards the end frame of the transition duct and drilled at an acute angle relative to the outer wall of the transition duct. Effusion cooling geometry, including coverage area, hole size, and surface angle will be optimized in the transition duct to tailor the temperature levels and gradients in order to minimize thermally induced stresses. The combination of the increase in radii of curvature of the panel assembly with the effusion cooling holes reduces component stresses and increases component life.

17 Claims, 6 Drawing Sheets

EFFUSION COOLED TRANSITION DUCT

BACKGROUND OF INVENTION

This invention applies to the combustor section of gas turbine engines used in powerplants to generate electricity. More specifically, this invention relates to the structure that transfers hot combustion gases from a can-annular combustor to the inlet of a turbine.

In a typical can annular gas turbine engine, a plurality of combustors are arranged in an annular array about the engine. The combustors receive pressurized air from the engine's compressor, adds fuel to create a fuel/air mixture, and combusts that mixture to produce hot gases. The hot gases exiting the combustors are utilized to turn the turbine, which is coupled to a shaft that drives a generator for generating electricity.

The hot gases are transferred from the combustor to the turbine by a transition duct. Due to the position of the combustors relative to the turbine inlet, the transition duct must change cross-sectional shape from a generally cylindrical shape at the combustor exit to a generally rectangular shape at the turbine inlet. In addition the transition duct undergoes a change in radial position, since the combustors are typically mounted radially outboard of the turbine.

The combination of complex geometry changes as well as excessive temperatures seen by the transition duct create a harsh operating environment that can lead to premature deterioration, requiring repair and replacement of the transition ducts. To withstand the hot temperatures from the combustor gases, transition ducts are typically cooled, usually by air, either with internal cooling channels or impingement cooling. Severe cracking has occurred with internally air-cooled transition ducts having certain geometries that operate in this high temperature environment. This cracking may be attributable to a variety of factors. Specifically, high steady stresses in the region around the aft end of the transition duct where sharp geometry changes occur can contribute to cracking. In addition stress concentrations have been found that can be attributed to sharp corners where cooling holes intersect the internal cooling channels in the transition duct. Further complicating the high stress conditions are extreme temperature differences between portions of the transition duct.

The present invention seeks to overcome the shortfalls described in the prior art and will now be described with particular reference to the accompanying drawings.

DETAILED DESCRIPTION

Figure 1:
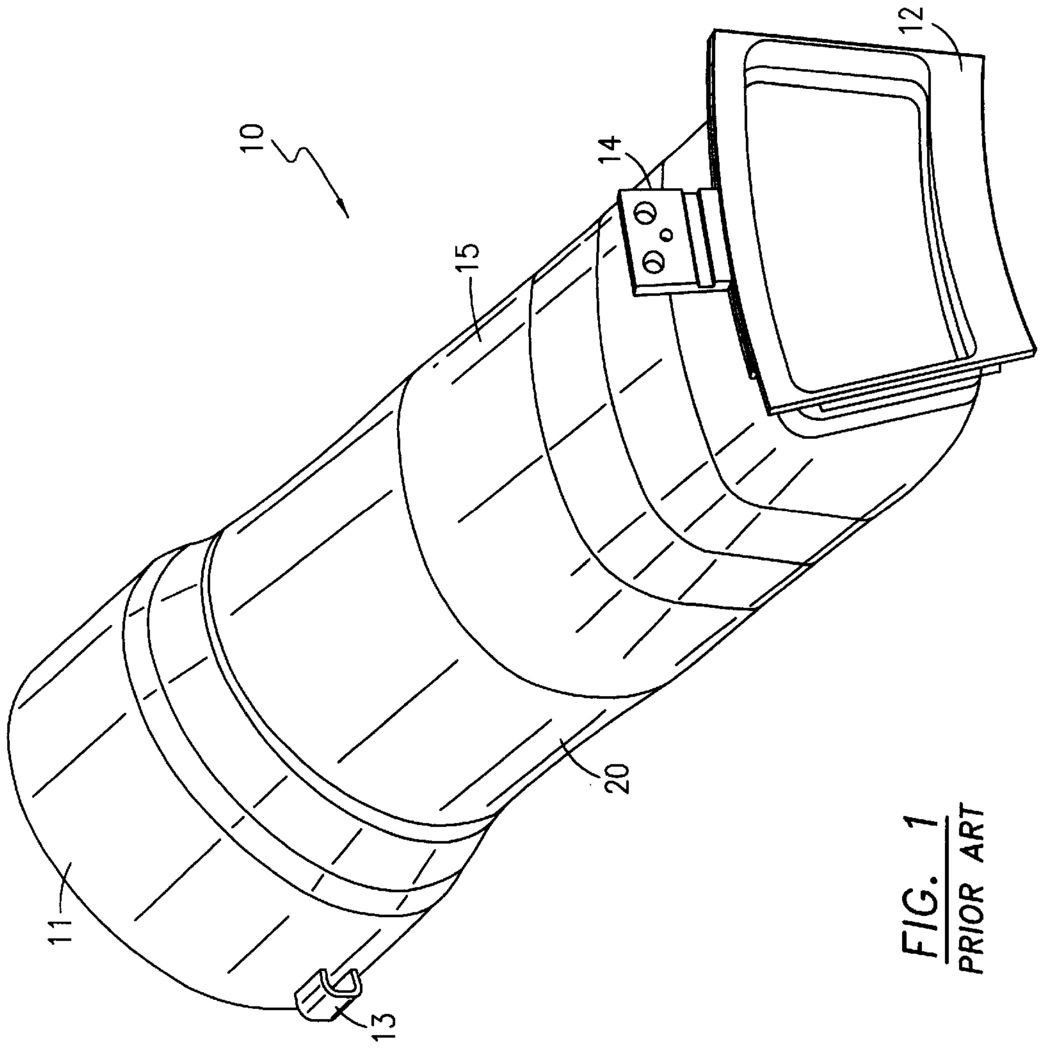
FIG. 1 PRIOR ART
FIG. 1 is a perspective view of a prior art transition duct.
Figure 2:
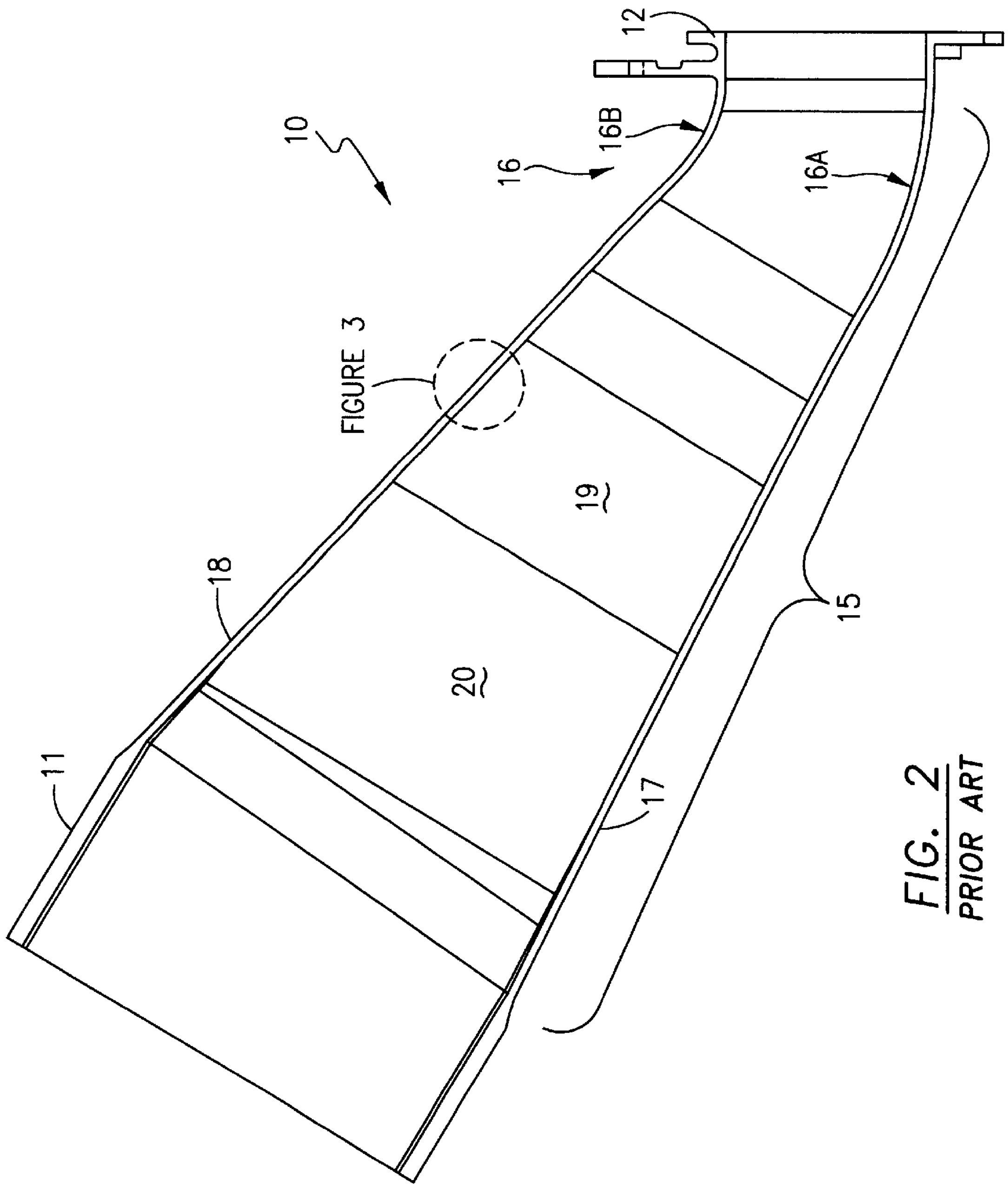
FIG. 2 PRIOR ART
FIG. 2 is a cross section view of a prior art transition duct.

Referring to FIG. 1, a transition duct 10 of the prior art is shown in perspective view. The transition duct includes a generally cylindrical inlet sleeve 11 and a generally rectangular exit frame 12. The generally rectangular exit shape is defined by a pair of concentric arcs of different diameters connected by a pair of radial lines. The can-annular combustor (not shown) engages transition duct 10 at inlet sleeve 11. The hot combustion gases pass through transition duct 10 and pass through exit frame 12 and into the turbine (not shown). Transition duct 10 is mounted to the engine by a forward mounting means 13, fixed to the outside surface of inlet sleeve 11 and mounted to the turbine by an aft mounting means 14, which is fixed to exit frame 12. A panel assembly 15, connects inlet sleeve 11 to exit frame 12 and provides the change in geometric shape for transition duct 10. This change in geometric shape is shown in greater detail in FIG. 2.

The panel assembly 15, which extends between inlet sleeve 11 and exit frame 12 and includes a first panel 17 and a second panel 18, which are joined along axial seams 20, tapers from a generally cylindrical shape at inlet sleeve 11 to a generally rectangular shape at exit frame 12. The majority of this taper occurs towards the aft end of panel assembly 15 near exit frame 12 in a region of curvature 16. This region of curvature includes two radii of curvature, 16A on first panel 17 and 16B on second panel 18. Panels 17 and 18 each consist of a plurality of layers of sheet metal pressed together to form channels in between the layers of metal. Air passes through these channels to cool transition duct 10 and maintain metal temperatures of panel assembly 15 within an acceptable range. This cooling configuration is detailed in FIG. 3.

Figure 3:
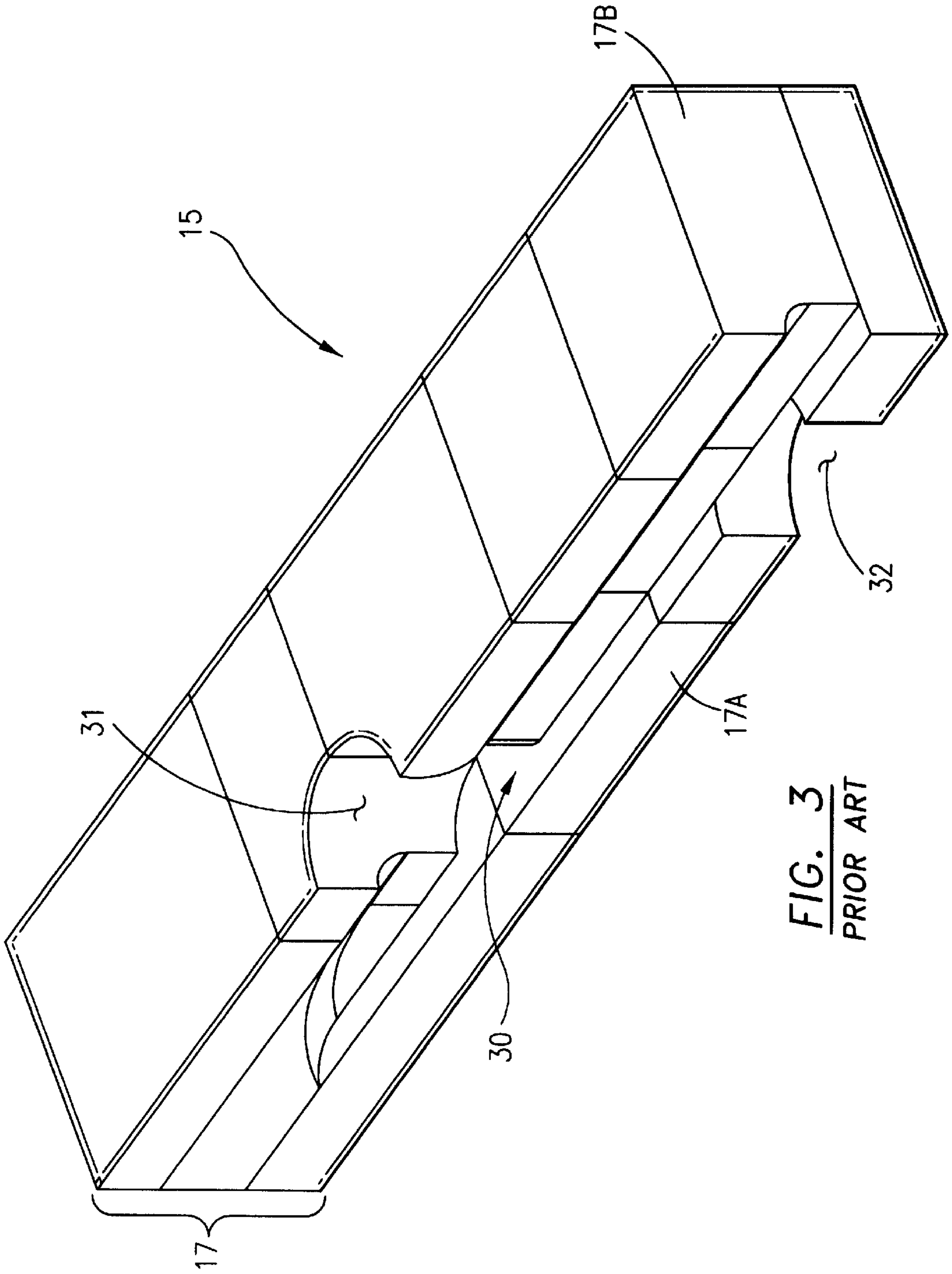
FIG. 3 PRIOR ART
FIG. 3 is a perspective view of a portion of the prior art transition duct cooling arrangement.

A cutaway view of panel assembly 15 with details of the channel cooling arrangement is shown in detail in FIG. 3. Channel 30 is formed between layers 17A and 17B of panel 17 within panel assembly 15. Cooling air enters duct 10 through inlet hole 31, passes through channel 30, thereby cooling panel layer 17A, and exits into duct gaspath 19 through exit hole 32. This cooling method provides an adequate amount of cooling in local regions, yet has drawbacks in terms of manufacturing difficulty and cost, and may contribute to cracking of ducts when combined with the geometry and operating conditions of the prior art.

Figure 4:
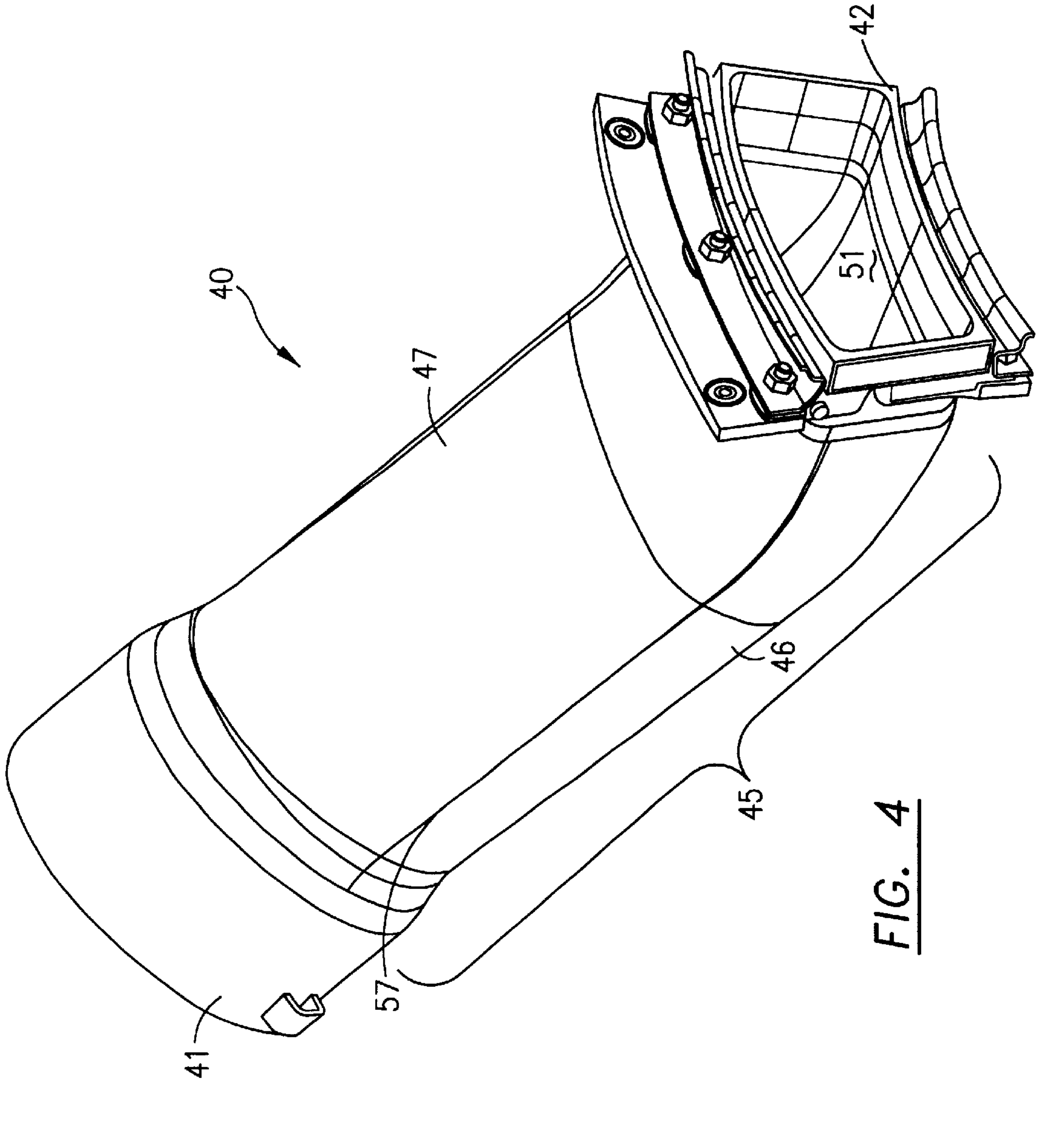
FIG. 4 is a perspective view of the present invention transition duct.
Figure 5:
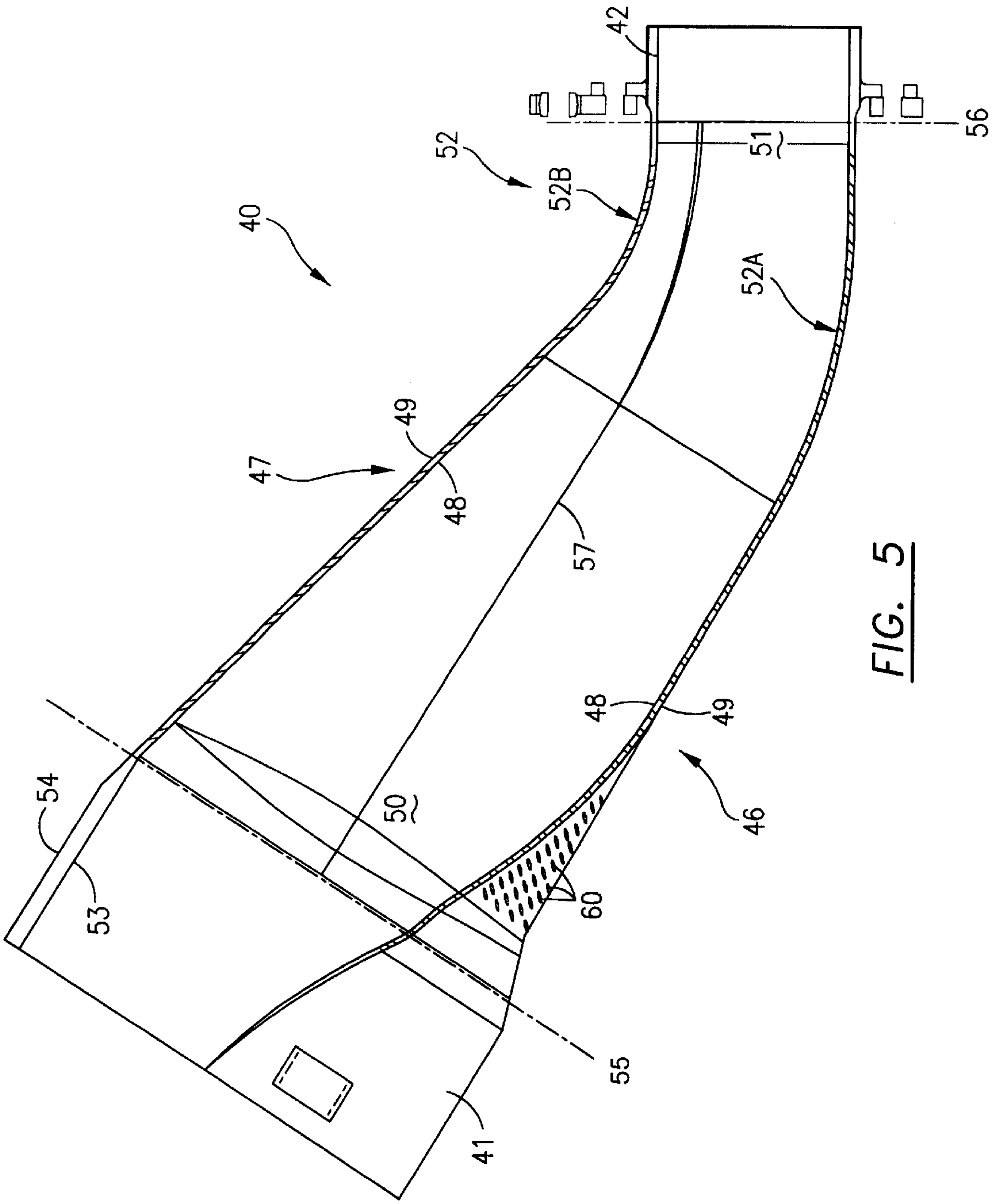
FIG. 5 is a cross section view of the present invention transition duct.
Figure 6:
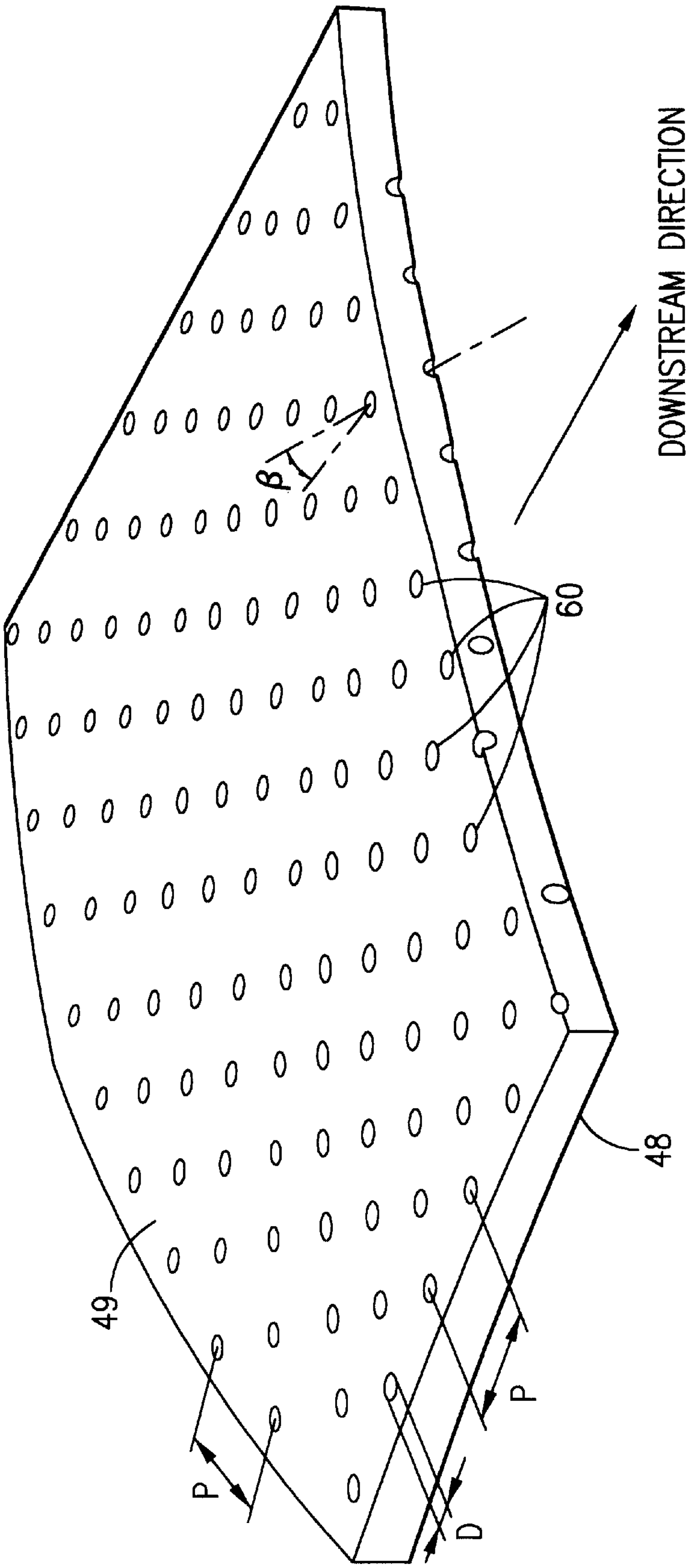
FIG. 6 is a perspective view of a portion of the present invention transition duct cooling arrangement.

An improved transition duct 40, as shown in FIGS. 4–6, includes a generally cylindrical inlet sleeve 41, a generally rectangular aft end frame 42, and a panel assembly 45. Panel assembly 45 includes a first panel 46 and a second panel 47, each constructed from a single sheet of metal at least 0.125 inches thick. The panel assembly, inlet sleeve, and end frame are typically constructed from a nickel-base superalloy such as Inconel 625. Panel 46 is fixed to panel 47 by a means such as welding along seams 57, there by forming a duct having an inner wall 48, an outer wall 49, a generally cylindrical inlet end 50 forming plane 55, and a generally rectangular exit end 51 which forms plane 56. inlet sleeve 41, with inner diameter 53 and outer diameter 54, is fixed to panel assembly 45 at cylindrical inlet end 50 while aft end frame 42 is fixed to panel assembly 45 at rectangular exit end 51.

Transition duct 40 includes a region of curvature 52 where the generally cylindrical duct tapers into the generally rectangular shape. A first radius of curvature 52A, located along first panel 46, is at least 10 inches, while a second radius of curvature 52B, located along second panel 47, is at least 3 inches. This region of curvature is greater than that of the prior art and serves to provide a more gradual curvature of panel assembly 45 towards end frame 42. This more gradual curvature allows operating stresses to spread throughout the panel assembly and not concentrate in one section. The result is lower operating stresses for transition duct 40.

The improved transition duct 40 utilizes an effusion-type cooling scheme consisting of a plurality of cooling holes 60 extending from outer wall 49 to inner wall 48 of panel assembly 45. Cooling holes 60 are drilled, at a diameter D, in a downstream direction towards aft end frame 42, with the holes forming an acute angle β relative to outer wall 49. Angled cooling holes provide an increase in cooling effectiveness for a known amount of cooling air due to the extra length of the hole, and hence extra material being cooled. In order to provide a uniform cooling pattern, the spacing of the cooling holes is a function of the hole diameter, such that there is a greater distance between holes as the hole size increases, for a given thickness of material.

Acceptable cooling schemes for the present invention can vary based on the operating conditions, but one such scheme includes cooling holes 60 with diameter D of at least 0.040 inches at a maximum angle β to outer wall 49 of 30 degrees with the hole-to-hole spacing, P, in the axial and transverse direction following the relationship: $P \leqq (15 \times D)$. Such a hole spacing will result in a surface area coverage by cooling holes of at least 20%.

Utilizing this effusion-type cooling scheme eliminates the need for multiple layers of sheet metal with internal cooling channels and holes that can be complex and costly to manufacture. In addition, effusion-type cooling provides a more tailored cooling of the transition duct. This improved cooling scheme in combination with the more gradual geometric curvature disclosed will reduce operating stresses in the transition duct and produce a more reliable component requiring less frequent replacement.

While the invention has been described in what is known as presently the preferred embodiment, it is to be understood that the invention is not to be limited to the disclosed embodiment but, on the contrary, is intended to cover various modifications and equivalent arrangements within the scope of the following claims.

What we claim is:

1. An effusion cooled transition duct for transferring hot gases from a combustor to a turbine comprising:

a panel assembly comprising:

a first panel formed from a single sheet of metal;

a second panel formed from a single sheet of metal;

said first panel fixed to said second panel by a means such as welding thereby forming a duct having an inner wall, an outer wall, a thickness therebetween said walls, a generally cylindrical inlet end, and a generally rectangular exit end, said inlet end defining a first plane, said exit end defining a second plane, said first plane oriented at an angle relative to said second plane;

a generally cylindrical inlet sleeve having an inner diameter and outer diameter, said inlet sleeve fixed to said inlet end of said panel assembly;

a generally rectangular aft end frame, said frame fixed to said exit end of said panel assembly;

a plurality of cooling holes in said panel assembly, each of said cooling holes having a diameter D and separated from the closest adjacent one of said cooling holes by a distance of at least P in the axial and transverse directions, said cooling holes extending from said outer wall to said inner wall, and oriented at an acute angle β relative to said outer wall at the location of where said cooling hole penetrates said outer wall.

2. The transition duct of claim 1 wherein said acute angle β is a maximum of 30 degrees.

3. The transition duct of claim 2 wherein said diameter D of said cooling holes is at least 0.040 inches.

4. The transition duct of claim 1 wherein said cooling holes are drilled in a direction from said outer wall towards said inner wall and angled in a direction towards said aft end frame.

5. The transition duct of claim 1 wherein said distance P in said axial and transverse directions is less than or equal to 15 times said cooling hole diameter D.

6. The transition duct of claim 1 wherein said panel assembly contains cooling holes covering at least 20% of said walls by surface area.

7. The transition duct of claim 1 wherein said panel assembly, inlet sleeve, and aft end frame are manufactured from a nickel-base superalloy such as Inconel 625.

8. The transition duct of claim 1 wherein said thickness is at least 0.125 inches.

9. An effusion cooled transition duct for transferring hot gases from a combustor to a turbine comprising:

a panel assembly comprising:

a first panel formed from a single sheet of metal;

a second panel formed from a single sheet of metal;

said first panel fixed to said second panel by a means such as welding thereby forming a duct having an inner wall, an outer wall, a thickness therebetween said walls, a generally cylindrical inlet end, and a generally rectangular exit end, said inlet end defining a first plane, said exit end defining a second plane, said first plane oriented at an angle relative to said second plane;

a first radius of curvature located along said first panel between said cylindrical inlet and said rectangular exit end;

a second radius of curvature located along said second panel between said cylindrical inlet end and said rectangular exit end;

a generally cylindrical inlet sleeve having an inner diameter and outer diameter, said inlet sleeve fixed to said inlet end of said panel assembly;

a generally rectangular aft end frame, said frame fixed to said exit end of said panel assembly;

a plurality of cooling holes in said panel assembly, each of said cooling holes having a diameter D and separated from the closest adjacent one of said cooling holes by a distance of at least P in the axial and transverse directions, said cooling holes extending from said outer wall to said inner wall, and oriented at an acute angle β relative to said outer wall at the location of where said cooling hole penetrates said outer wall.

10. The transition duct of claim 9 wherein said acute angle β is a maximum of 30 degrees.

11. The transition duct of claim 10 wherein said diameter D of said cooling holes is at least 0.040 inches.

12. The transition duct of claim 9 wherein said cooling holes are drilled in a direction from said outer wall towards said inner wall and angled in a direction towards said aft end frame.

13. The transition duct of claim 9 wherein said distance P in said axial and transverse directions is less than or equal to 15 times said cooling hole diameter D.

14. The transition duct of claim 9 wherein said panel assembly contains cooling holes covering at least 20% of said walls by surface area.

15. The transition duct of claim 9 wherein said panel assembly, inlet sleeve, and aft end frame are manufactured from a nickel-base superalloy such as Inconel 625.

16. The transition duct of claim 9 wherein said thickness is at least 0.125 inches.

17. The transition duct of claim 9 wherein said first radius of curvature is at least 10 inches and said second radius of curvature is at least 3 inches.

* * * * *